Figure 16:
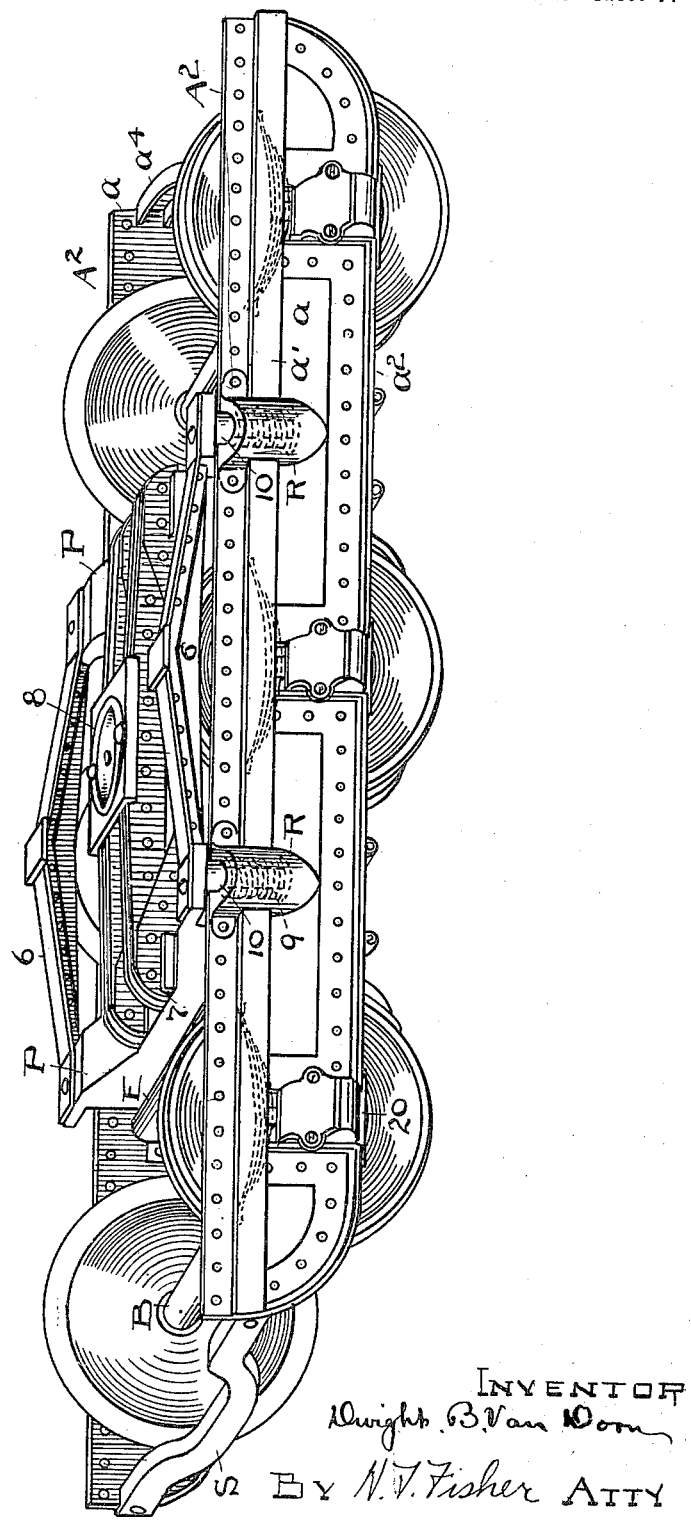

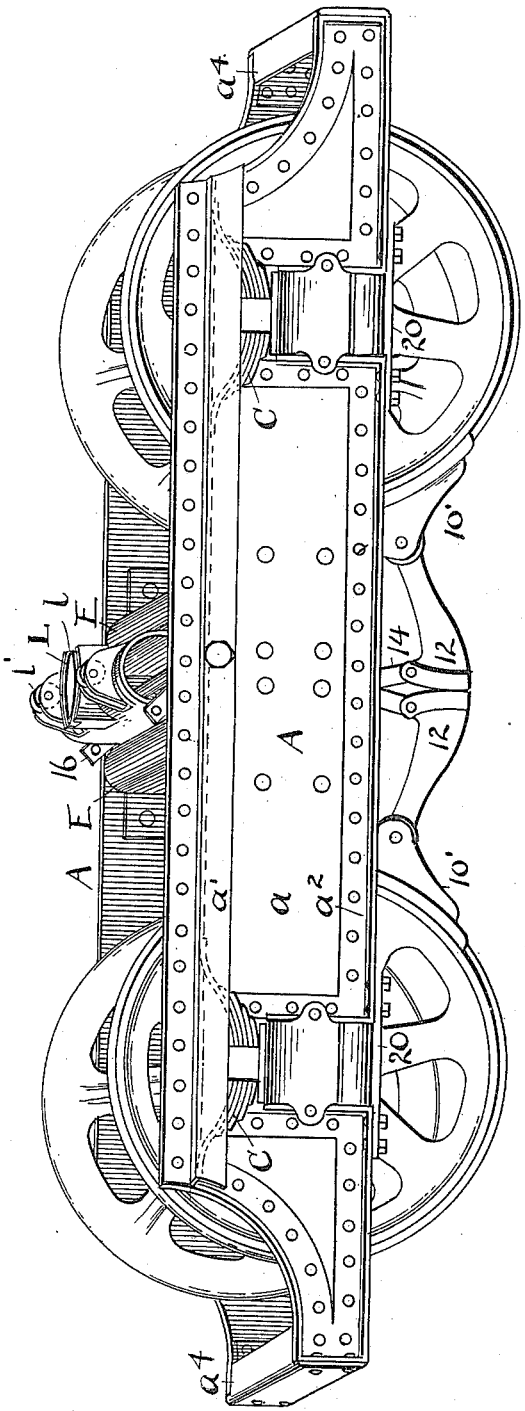

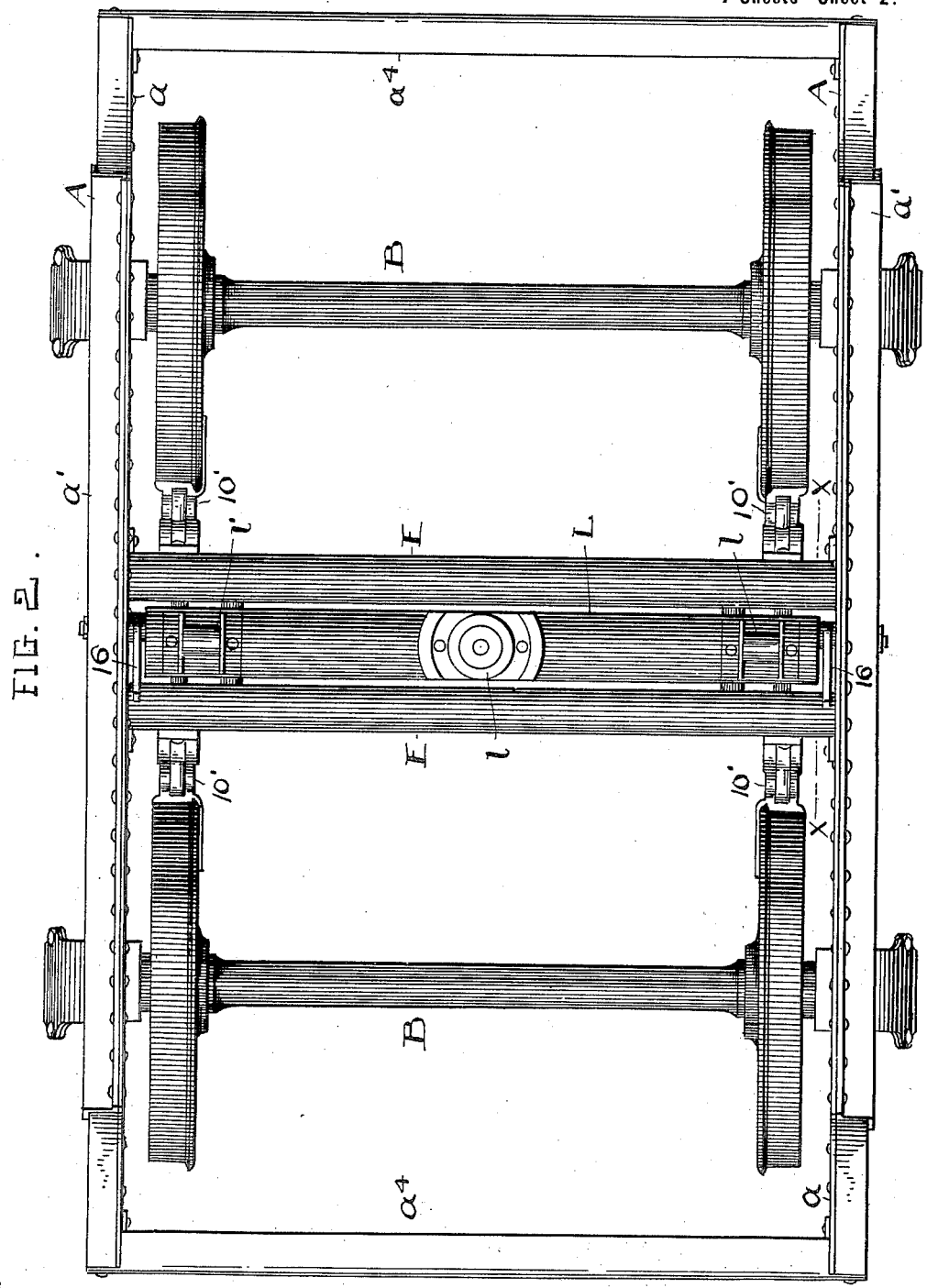

No. 661,432. Patented Nov. 6, 1900.
D. B. VAN DORN.
CAR TRUCK AND BRAKE.
(Application filed Mar. 17, 1900.)
(No Model.) 7 Sheets—Sheet 3.
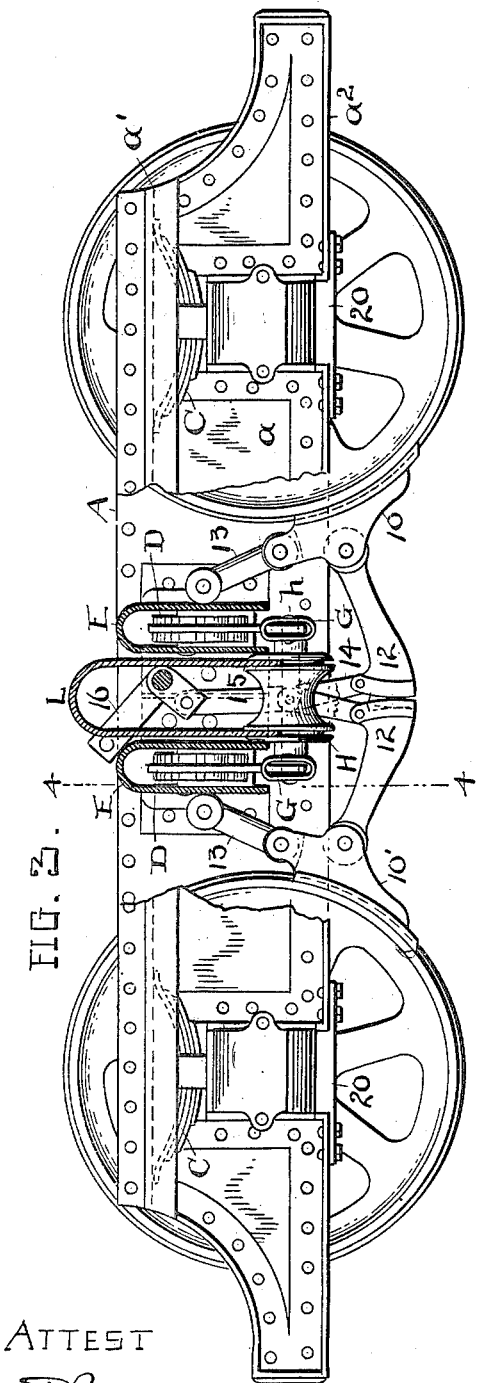
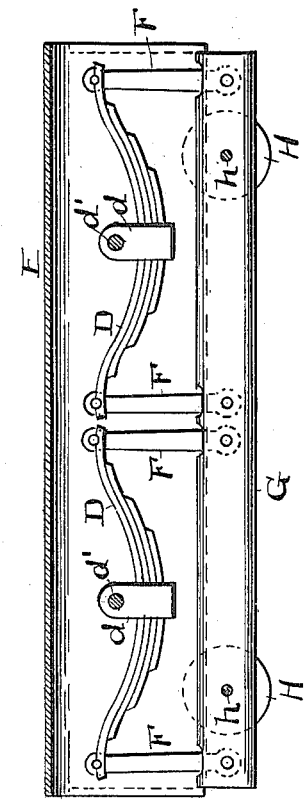
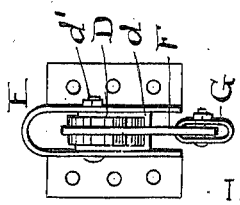
ATTEST
INVENTOR
Dwight B. Van Dorn
BY H. T. Fisher
ATTY No. 661,432. Patented Nov. 6, 1900.
D. B. VAN DORN.
CAR TRUCK AND BRAKE.
(Application filed Mar. 17, 1900.)
(No Model.) 7 Sheets—Sheet 4.
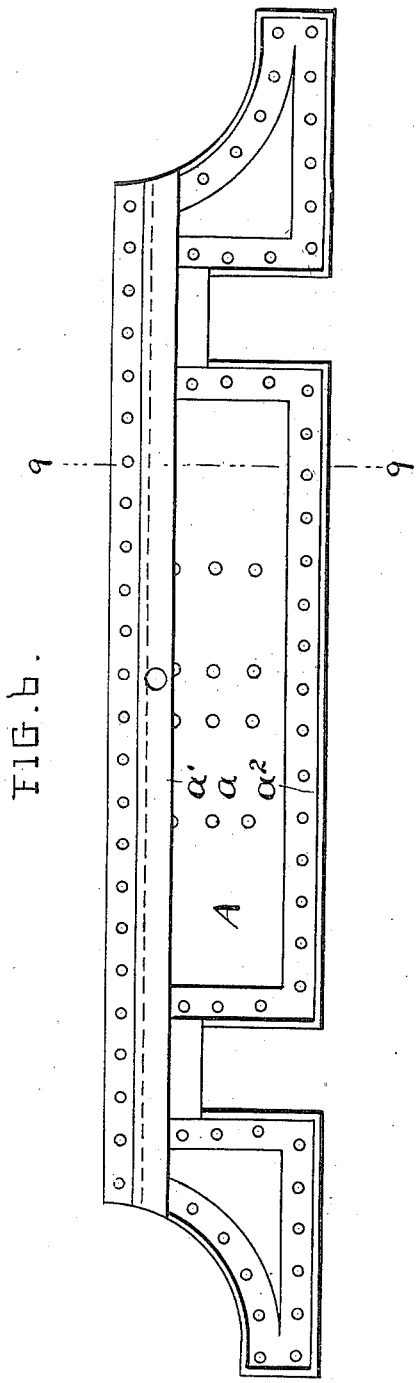
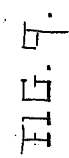
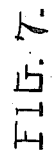
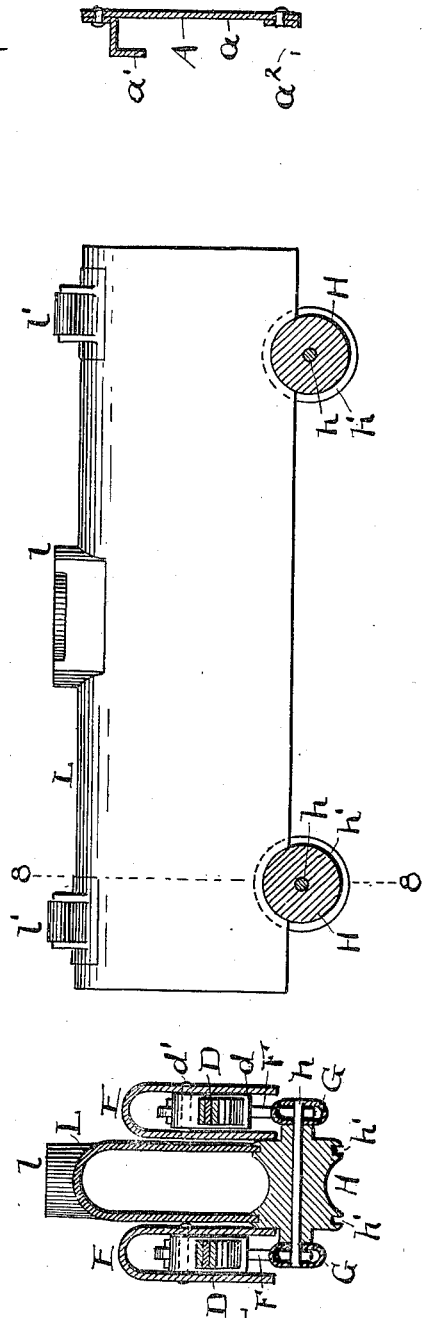
ATTEST
INVENTOR
Dwight B. Van Dorn
By W. J. Fisher
ATTY No. 661,432. Patented Nov. 6, 1900.
D. B. VAN DORN.
CAR TRUCK AND BRAKE.
(Application filed Mar. 17, 1900.)
(No Model.) 7 Sheets—Sheet 5.
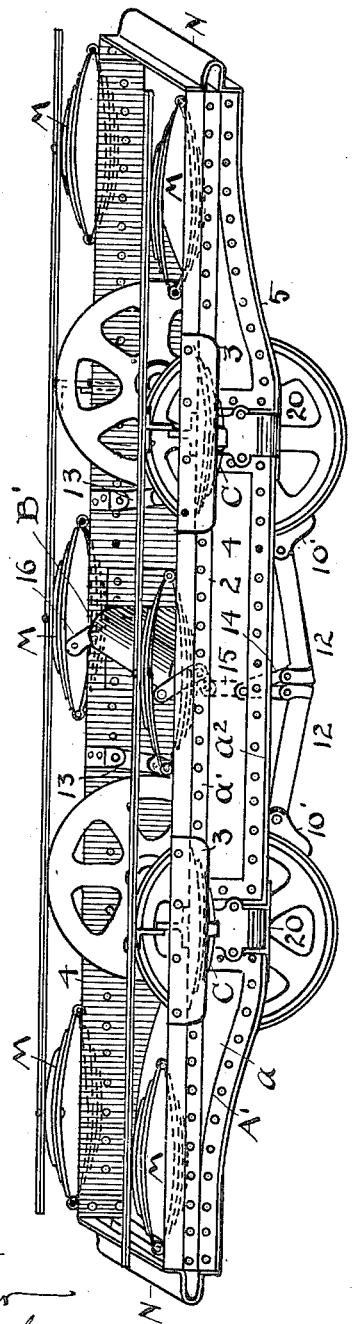
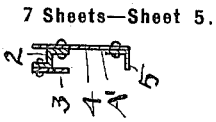
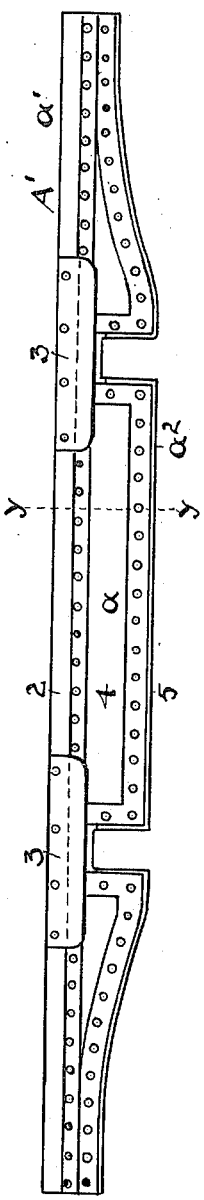
ATTEST
R. B. Moser
M. A. Sheehan
INVENTOR
Dwight B. Van Dorn
BY H. T. Fisher ATTY No. 661,432. Patented Nov. 6, 1900.
D. B. VAN DORN.
CAR TRUCK AND BRAKE.
(Application filed Mar. 17, 1900.)
(No Model.) 7 Sheets—Sheet 6.
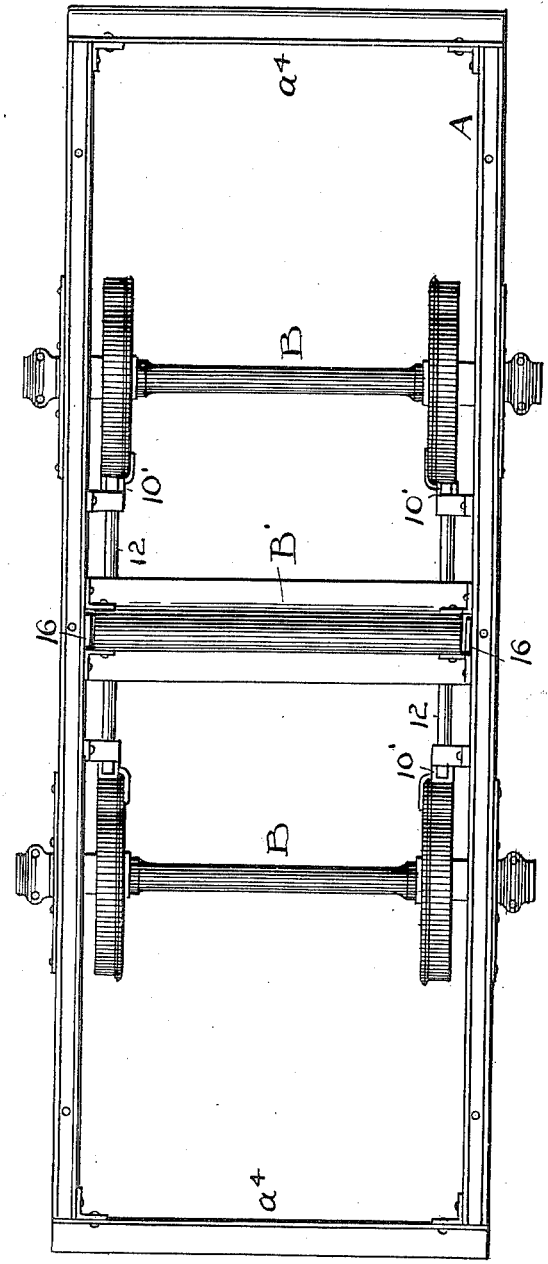
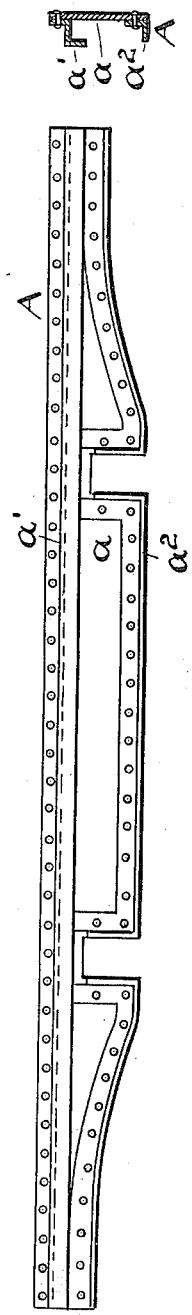
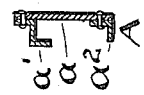

No. 661,432. Patented Nov. 6, 1900.
D. B. VAN DORN.
CAR TRUCK AND BRAKE.
(Application filed Mar. 17, 1900.)
(No Model.) 7 Sheets—Sheet 7.

ATTEST
R. B. Moser
M. A. Sheehan

INVENTOR
Dwight B. Van Dorn
By N. T. Fisher ATTY

UNITED STATES PATENT OFFICE.

DWIGHT B. VAN DORN, OF CLEVELAND, OHIO.

CAR TRUCK AND BRAKE.

SPECIFICATION forming part of Letters Patent No. 661,432, dated November 6, 1900.

Application filed March 17, 1900. Serial No. 9,043. (No model.)

*To all whom it may concern:*

Be it known that I, DWIGHT B. VAN DORN, a citizen of the United States, residing at Cleveland, in the county of Cuyahoga and State of Ohio, have invented certain new and useful Improvements in Car Trucks and Brakes; and I do declare that the following is a full, clear, and exact description of the invention, which will enable others skilled in the art to which it appertains to make and use the same.

My invention relates to car trucks and brakes; and the invention consists in the construction, combination, and arrangement of parts, substantially as shown and described, and particularly pointed out in the claims.

In the accompanying drawings I show the invention in several different styles of trucks, as will appear; but the generic idea of the invention runs unchanged through all of them.

Figure 1 is a perspective side elevation of a truck adapted to one end of a car and having two sets of wheels and intermediate brakes, and Fig. 2 is a plan view thereof. Fig. 3 is a side elevation of the truck shown in Figs. 1 and 2, with the girder-frame broken away at the near side from wheel to wheel and showing a cross-section of the intermediate mechanism on a line corresponding substantially to $x\,x$, Fig. 2. Fig. 4 is a longitudinal sectional elevation of one of the leaf-spring housings and carriers corresponding to line 4 4, Fig. 3, and showing the springs in elevation thereon and also an elevation of the equalizing-bar, from which the said parts are supported by links. Fig. 5 is an end elevation of one of said leaf-spring housings and its springs and the equalizing-bar shown in Fig. 4. Fig. 6 is an elevation of one side of the girder-frame alone and with all attachments removed. Fig. 7 is a side elevation of the central preferably sheet-metal carrying-frame which comes between the two spring-housings; and Fig. 8 is a cross-section of said frame on a line corresponding substantially to 8 8, Fig. 7, and of said side housings and springs. Fig. 9 is a cross-section of Fig. 6 on line 9 9, and a similar view would occur if taken on any portion of Fig. 6 between its end portions. Fig. 10 is a perspective side elevation of a form of the car-truck adapted especially to lighter street-car work, wherein only four carrying-wheels are used, and the truck extends a considerable distance beyond the wheels at both ends, thus affording a long car on an otherwise compactly-arranged carrying-base. Fig. 11 is a plain side elevation of one side of the truck-frame seen in Fig. 10, all other parts being removed; and Fig. 12 is a cross-section of this side, say, on line $y\,y$, Fig. 11. Both sides of this frame are of course alike. Fig. 13 is a plan view of a slight modification of the view shown in Fig. 10, but omitting the springs and the rails thereon. Fig. 14 is a side elevation of the frame in Fig. 13, and Fig. 15 is a cross-section thereof. Fig. 16 is a perspective side elevation of a six-wheel car-truck such as is adapted to heavy sleeping-cars and the like and in which certain supplemental features occur not shown in the foregoing views nor necessary in the lighter constructions.

In each and all the forms of frame shown by me or made according to my invention I have a strictly pressed-steel structure throughout, in which each part of the frame is fashioned according to the place it is to occupy and is of such weight and size as the truck demands, according to its intended use. This enables me to make a frame of exceptional lightness as compared with frames heretofore and of exceptional strength also, as well as symmetry and attractiveness in design. Then in case it be desired to introduce motors or other machinery of any kind within the truck my construction of frame and disposition of parts therein is such that an unusual amount of room is afforded for the introduction of other parts, as may be desirable. This will appear obvious as the several frames are each more particularly examined in the further description herein.

Referring now to frame A, Figs. 1, 2, 3, 6, and 9, its construction in the main will be seen in side elevation, Fig. 6, and cross-section, Fig. 9. In this latter view it appears as consisting of or comprising three several elements—the body-plate $a$, the substantially Z strip or plate $a'$ along its top, and the angle-strip $a^2$ along its bottom and outer side. These parts or elements $a\,a'\,a^2$ are riveted together, and they are each fashioned into such shape as to give the general structure seen in elevation, Fig. 6.

Each of the constituent elements $a$, $a'$, and $a^2$ may be reinforced, as shall be deemed necessary for greater strength, and the flat plate $a$ may be supplemented by another such plate or be made of heavier metal relatively or otherwise strengthened as shall be found desirable in any given case, so that while I show a certain construction I may vary therefrom, as above indicated, without departing from the invention. This of course applies also to the other styles of frames shown, one of which is seen in cross-section, Fig. 12, and all said frames, first and last, are alike in this particular, that they are built of pressed sheet-steel fashioned along the edges of the body portion top and bottom with angle-iron edgings or portions. These serve not only for strengthening purposes, but for other purposes as well, as will be seen, and provide a perfectly plain flat inner side to the truck-frame, which is exceedingly desirable.

In Figs. 1 and 6 the lower edging $a^2$ is shown as extending upward at the sides of the openings for the axle bearings or boxes, while the extremities of the frame are curved down from the top and connected by a box-shaped end piece $a^4$, riveted therein, Fig. 1. The truck-frame as thus constructed is supported on the axles B by means of the half-elliptic leaf-springs C, which are introduced between the overhanging angle plate or edging $a'$ and the body-plate $a$, Fig. 1, and rest on the axle or axle-boxes centrally below, so that primarily the weight of the truck and its load comes onto the axles in this way. Any suitable boxes may be used and any suitable supports thereon for the springs, and there is the usual room for vertical play of the truck on the springs in respect to the boxes and axles, and what is here said in respect to the construction and operation of parts as seen in Fig. 1 applies also to the other forms of truck herein shown, because they all use the springs C. I have shown and prefer leaf-springs C in any event for this use; but any other form or shape of spring that can be used advantageously in lieu thereof may of course be adopted. It is seen, however, that this construction of frame is especially adapted to leaf-springs, as they lie in and are largely concealed by the angle-plate $a'$, which forms a housing, as well as a bearing, for them and there is no objectionable protrusion of the springs at any point. Now having the truck operatively mounted on the car-axles the car-body (not shown) is adapted to rest on the truck between the axles, as seen in Figs. 1 and 16, and centrally and at the ends of the truck, as in Fig. 10. If two trucks are used for a car, the rest is at the middle; but if a single truck be used there should be end support, especially if the axles be brought comparatively near together. This, however, does not preclude middle support also, as seen in Fig. 10.

Referring now first to the construction in Figs. 1 to 9, it will be seen that I have concentrated or massed the immediate car-supporting parts midway of the truck between the axles, where they are arranged transversely to the line of travel and of the length of the frame. These parts, separately considered, comprise two sets of half-elliptic leaf-springs D, Figs. 4, 5, and 8, supported at their middle by yokes or clips $d$ on pivots $d'$ in the sides of the housings E. These housings are substantially U-shaped in cross-section, but inverted to have the rounded portion on top and to be open at the bottom, and their ends are flanged and riveted to the girder-frame, so that they practically constitute a part of this frame and serve as central braces and connections for the sides of the frame, as well as carriers for the entire weight of the car resting down thereon through springs D. Hence these springs and all that has to do with their support need to be of such strength as will assure perfect safety and serviceability with whatever load may come upon them or strain under trying circumstances.

There are two of the U-shaped spring-carriers E in truck A, with a slight space between them, and the ends of the springs D supported therein are each engaged with a link F, engaged on an equalizing-bar G, centrally beneath said parts and of the same length substantially as the housing or carrier E. The said links F have pivotal connection at each end, so as to yield to any rocking action of the car, and their lower ends are shown here as set into the bar G, which is elliptical in cross-section and tubular and with openings down through its top to receive the said links F. This or any equivalent construction of equalizing-bar may be used. The said equalizing-bars G are two in number, one for each housing and its set of springs D, and they are connected and rendered jointly serviceable by the spindles or axles $h$, on which are the rollers H, one on each axle. The ends of said axles extend into or through the equalizing-bars, and the rollers occupy the intermediate space between them, substantially as seen in Fig. 3. Thus there is a roller H and axle connection at each end of the two equalizing-bars, which brings them into unitary relationship and service. This forms a car-body support centrally of the truck, with the combined housings and carriers E rigid therewith and a spring mechanism in each housing connected beneath and between said housings at their bottom and adapted to have the weight of the car-body rest down upon them from the top. The rollers H are each provided with a comparatively deep annular channel $h'$ at their ends, but they may be of any other desired shape or form outside of this structural requirement. Now it remains simply to introduce the car bolster or support into this prepared organization, and the said support is shown here as made, like the housings E, out of sheet-steel of requisite weight and bent into U form, with the round on top and the edges down and resting on the rollers H. Rounded cavities conforming exactly to the size and shape of the rollers are made in the edges of the bolster L and fit down into the channels $h'$ in the said rollers, as seen in Fig. 7. This is not really intended to afford a rolling action so much as a rocking action, which is all that is necessary, and the said bolster might set at a considerably-lower depth on the roller if deemed best. Centrally at its top there is a hub $l$, which forms the central point of rest and connection for the car-body, while a roller $l'$ at each end of said bolster forms a support for the side of the car. Thus, first and last, the entire weight of one end of the car comes down upon this bolster and through it rests equally on the side springs D, so that said springs carry and cushion the car, while the axle-springs C afford a further spring-rest through the truck.

I have shown a "sheet-metal bolster," so called, and such I prefer, but its exact fashioning and kind of metal are less material than its use and adaptation to rest the weight of the car down on the rollers in the manner set forth. It might be made solid and serve my purpose, but for sundry reasons a bolster shaped up and arranged as shown here is deemed altogether preferable. The principle on which it acts on the rollers is not unlike that which occurs in parallel pivoted bars of the same length, whereby the rocking or swaying of the car is accommodated without danger or violence at the point where more or less accommodation is required and which at the same time affords a secure rest for the load.

In the modification of truck-frame $A'$, Figs. 10, 11, and 12, the Z metal strip 2 along the top is inverted, as compared with Figs. 9 and 15, so as to provide a seat from the top for the elliptic springs M, and over its outside above the axles I rivet a plate or shield 3, within which rest the springs C very much as they otherwise do in the other frames shown. The side 4 and the angle-iron 5 below are like the corresponding parts $a$ and $a^2$ in Figs. 9 and 15. In this case I show also a modified form of end piece N, as compared with the foregoing views, the same being bent to U shape centrally and longitudinally and riveted through its edges or wings against the ends of the frame from the outside. There are other minor points of difference, but none such as need to be mentioned here.

Fig. 16 shows a six-wheel truck for heavy work, but not different materially from the foregoing trucks, except in the fact of its elaboration for heavier purposes. It has, therefore, the three sets of wheels and axles and two sets of spring-housings E, with springs D therein, exactly as in Figs. 3, 4, and 5, one set on each side of the central axle, and with equalizing-bar, rollers, and the like beneath; but in lieu of a single bolster it shows a bolster-frame having cross-pieces P at each end going down and resting on the rollers like bolsters E and fashioned in the same way, and these are rigidly connected at their top by suitable tie-bars or girders 6, which are raised slightly at their center to clear the wheels, and they form side rubbing or contacting surfaces for the car-body when it is caused to lean or lurch sidewise, while other girders or connecting-bars 7 connect the bolster portions P centrally and are mounted with a plate 8, having a hole through its center to serve the purpose of a central car-body rest and carrier like the hub $l$ in Fig. 7. The weight of the car, therefore, is thus equally distributed through the said bolster-frame to both sets of spring-supports and equalizers below, and in order to arrest any dangerous side swaying, as is liable to occur in heavy sleepers, I supplement said springs with the spiral springs 9, housed in pockets R, fixed to the outside of the truck-frame and carrying the sliding bolt 10, which bears up against the ends of the bolster parts P. I might use leaf-springs here, but prefer those shown. Here also I show a modified form of end connection S for the frame $A^2$, but either of the other styles would do as well.

In Figs. 10 and 13, wherein the car-body does not rest on springs centrally of the truck, the spring housings and bolster are omitted, and in lieu of said housings I place a transverse brace $B'$ to give strength to the frame at this point.

Finally, the invention comprises a brake mechanism constructed to operate jointly against opposite wheels and comprising a brake-block 10' for each wheel, Fig. 3, and a set of toggle-levers 12, pivoted thereto at their rear and operating after the manner substantially of well-known locomotive-brakes, so far as these parts are concerned. The blocks 10' are each supported above from the truck-frame by a link 13, pivoted at both ends, and the said levers are each suspended by a set of two links 14 and 15, connected with their inner ends, Fig. 10, and the upper of the said two links pivoted to the short arm of the brake quadrant or bell-crank lever 16, which itself is pivoted at or in its angle in the truck-frame. The brake-operating mechanism is designed to connect with the longer arm of lever 16, whereby the levers 12 are raised at their meeting ends when the brake is set and are lowered when it is released. The ends of the transverse brace $B'$ are recessed to set the quadrant-lever on the frame within its ends, as seen in Fig. 13.

In some cases it may be desirable to have supplemental springs for the ends of a single bolster substantially like those shown in Fig. 16 for the corners of the bolster-frame, the ends of the bolster members proper, D, having the springs beneath the same. In like manner I may extend the bolster L at its ends and provide like springs for it.

Beneath each axle-box there is a cross-piece 20, which spans the opening in the girder-frame occupied by the said box and axle, and the said cross-piece serves to confine said parts as well as a strengthening medium for the frame at this point, which in a sense is weakened by said openings, but which is also fully repaired by the said cross-pieces. Then, again, if it becomes necessary to remove a box or axle it can be easily done by simply removing the cross-piece beneath the same.

What I claim is—

1. A car-truck having its sides formed of single flat steel plates and edgings of angle-iron riveted upon the outside of said plates along their top and bottom and smooth plain inner surfaces, substantially as described.

2. A car-truck having each side thereof formed wholly of flat metal plates having smooth unobstructed inner surfaces and separate right-angled plates riveted along the top and bottom edges on the outside of each side of the truck, the said body portion having openings for axle-boxes and angular reinforcing-strips at each side of said openings, in combination with the car-axles and springs on said axles outside said truck resting within the top right-angled plates, substantially as described.

3. A car-truck having each side made with a steel-plate body and a right-angled edging riveted thereto along its top and flat on top and bottom, in combination with truck-carrying springs bearing against said edging from below, substantially as described.

4. A car-truck constructed of steel plate with flat inner sides, a set of substantially U-shaped housings transversely across said truck and secured thereto at their ends, and springs supported in said housings, substantially as described.

5. A car-truck having plain inner sides and a set of combined braces and housings connecting said sides, said housings closed over their top and open at their bottom and having lateral flanges at their ends riveted to the sides of the truck, substantially as described.

6. The truck-frame and a set of transverse substantially U-shaped housings connecting the sides of the frame between its ends, springs in said housings and supporting connections between said springs beneath the housings, substantially as described.

7. The truck-frame and substantially U-shaped connections between the sides of the frame at about its center, a spring in each connection and an equalizing member beneath each spring and operatively connected therewith, and cross-supports between said equalizing members, substantially as described.

8. The truck-frame and the spring-housings fixed thereto, springs supported in said housings and equalizing mechanism supported from said springs and spanning the space between and below the housings, and a support for the car-body resting on said equalizing mechanism, substantially as described.

9. A car-truck and spring-supports across its center, a spring carried by each support, an equalizing-bar connected with each spring beneath the same, cross connections between the ends of said bars, and a bolster for the car-body resting on said cross connections between said spring-supports, substantially as described.

10. A car-truck having a set of spring-supports transversely across its middle portion, springs in said supports and equalizing mechanism connected with the said springs having rounded carriers, and a free bolster set down upon said carriers between the spring-supports, substantially as described.

11. The car-truck and the spring-housings therein, leaf-springs in said housings, equalizing mechanism comprising links operatively supported from said springs beneath the same, and connections between the links, and a bolster supported by said mechanism, substantially as described.

12. A car-truck and transversely-arranged spring-supports at its center and springs therein, equalizing mechanism connecting said springs having rounded bearings and a substantially U-shaped bolster having its edges fashioned to engage over said rounded bearings, substantially as described.

13. The car-truck and the transversely-arranged springs at its center, equalizing mechanism for said springs comprising rounded parts with channels and a substantially U-shaped bolster having its edges resting in said channels, substantially as described.

14. A car-truck having a set of springs transversely at its center and supports therefor fixed to the truck, equalizing mechanism connected with said springs comprising a set of rollers having each two channels around the same, and a bolster having recesses in its edges rounded to rest down in said channels, substantially as described.

15. The truck and the housings across its center, a leaf-spring in each housing, an equalizing-bar for each spring and links connecting said parts, rollers supported by and between said equalizing-bars, and a substantially U-shaped bolster riding on said rollers and constructed to carry the car-body, substantially as described.

16. The truck-frame, a set of spring-supporting housings across said frame and springs therein, an equalizing mechanism for said springs, and a bolster member resting thereon, substantially as described.

Witness my hand to the foregoing specification this 12th day of March, 1900.

DWIGHT B. VAN DORN.

Witnesses:
H. E. MUDRA,
R. B. MOSER.